United States Patent [19]

Erickson et al.

[11] Patent Number: 5,356,993
[45] Date of Patent: Oct. 18, 1994

[54] COREACTIVE CONJUGATED DIENE POLYMER COMPOSITIONS WHICH PHASE SEPARATE WHEN CURED

[75] Inventors: James R. Erickson, Katy; Michael A. Masse, Richmond; Steven H. Dillman, Houston; Esther M. Zimmermann, Houston; Dale L. Handlin, Jr., Houston, all of Tex.

[73] Assignee: Shell Oil Company, Houston, Tex.

[21] Appl. No.: 90,855

[22] Filed: Jul. 12, 1993

[51] Int. Cl.$^5$ ............................................. C08F 297/02
[52] U.S. Cl. .................................... 525/89; 525/314; 525/338; 525/383; 525/250
[58] Field of Search ................. 525/314, 338, 89, 383, 525/250

[56] References Cited

U.S. PATENT DOCUMENTS

| | | | |
|---|---|---|---|
| 3,970,608 | 7/1976 | Furukawa et al. | 526/339 |
| 4,135,037 | 1/1979 | Udipi et al. | 428/414 |
| 4,237,245 | 12/1980 | Halasa et al. | 525/272 |
| 5,149,895 | 9/1992 | Coolbaugh et al. | 526/173 |
| 5,210,359 | 5/1993 | Coolbaugh et al. | 526/173 |
| 5,229,464 | 7/1993 | Erickson et al. | 525/314 |

FOREIGN PATENT DOCUMENTS

0396780A1 11/1990 European Pat. Off. .
0441485A2  8/1991 European Pat. Off. .

OTHER PUBLICATIONS

"Compatibility of EKP-202 With Cationic Cure Vehicles", a product disclosure presented by Shell Oil Co. in the U.S. prior to Jul. 12, 1992.

Primary Examiner—James J. Seidleck
Assistant Examiner—I. Zemel
Attorney, Agent, or Firm—Keith M. Tackett

[57] ABSTRACT

This invention provides a reactive conjugated diene polymer composition that forms a phase-separated adhesive, sealant, or coating. The composition comprises an epoxidized polymer of conjugated dienes, a second reactive component which is phase separated from the polymerized conjugated diene upon cure, and optionally a tackifying resin. The invention also encompasses adhesive, coating and sealant compositions made with the above composition.

14 Claims, No Drawings

# COREACTIVE CONJUGATED DIENE POLYMER COMPOSITIONS WHICH PHASE SEPARATE WHEN CURED

FIELD OF THE INVENTION

This invention relates to reactive conjugated diene polymer compositions which are cured to form crosslinked adhesives, sealants, and coatings.

BACKGROUND OF THE INVENTION

Curing of adhesives, sealants, and coatings based on conjugated diolefins and, optionally, vinyl aromatics has increased the range of service properties for such compositions. Chemical or radiation curing of reactive conjugated diene polymers to make such crosslinked compositions is known. This curing causes covalent crosslinking of the polymerized conjugated dienes which is evidenced by a high gel content of the crosslinked polymer. Before crosslinking, the polymers are melt and solution processable but after crosslinking, the gel cannot be processed as melts or in solution. Crosslinking therefore enhances solvent resistance and improves elevated temperature shear properties, toughness and cohesion. Compositions can therefore be applied to a substrate in a melt or from solution and then crosslinked to form a superior adhesive, coating or sealant.

The presence of styrene blocks in the reactive conjugated diene polymers can result in a phase separated reactive block copolymer which can cure to form a phase separated adhesive, sealant, or coating. However, the styrene containing polymers are more difficult to process since the styrene blocks promote physical crosslinking of the reactive polymers prior to curing.

Curable adhesives, sealants and coatings which are based on epoxidized polymers are described in U.S. Pat. No. 5,229,464, issued Jul. 20, 1993, (T4797X) which is incorporated by reference herein. The epoxidized polymers may be blended with other reactive polymers as disclosed in the '464 patent to provide a balance of desired properties.

It is an object of the present invention to provide improved adhesive, sealant, and coating compositions which are easily processable in the melt or at high solids content before crosslinking but have a high gel content after crosslinking. Further, it is an object of this invention to provide an adhesive, coating or sealant composition which is based on this improved crosslinked block copolymer composition that achieves a unique balance of tack and strength properties.

SUMMARY OF THE INVENTION

This invention provides a conjugated diene based polymeric composition which cures to a phase separated adhesive, sealant, or coating. The composition is a coreactive blend of an epoxidized conjugated diene polymer which can be a linear, radial, or star polymer, and a coreacting polymer or diluent which forms a phase-separated crosslinked network in combination with the epoxidized polymer upon cure. Examples of epoxidized polymer formulations which result in phase separated cured adhesives, coatings or sealants include epoxidized conjugated diene/vinyl aromatic block copolymers and vernonia oil (a natural epoxy functional oil).

DETAILED DESCRIPTION OF THE INVENTION

The present invention is a radiation curable composition, containing from 20 to 70% by weight of an epoxidized polymer of a saturated or an unsaturated conjugated diene, from 1 to 30% by weight of a coreactant selected from the group consisting of epoxidized oils and epoxidized linear polymers that phase separate from the epoxidized star polymers upon cure, and from 0 to 80% by weight of a tackifying resin.

The epoxidized polymers include conjugated diene polymers having controlled epoxidation such as the radial polymers as described in U.S. Pat. No. 5,229,464, issued Jul. 20, 1993, entitled "Viscous Conjugated Diene Block Copolymers" (T4797X), which is incorporated herein by reference. The epoxidized star polymers typically have at least 4 polymeric arms per molecule with each arm having a peak molecular weight from 3,000 to 18,000, preferably 3,000 to 7,000. In order to make low viscosity compositions, the epoxidized star polymers, which have high total molecular weights in comparison to uncoupled linear polymer arms, do not contain polymeric segments or blocks that would phase separate prior to formulation of the radiation curable composition. The concentration of di-, tri-, or tetrasubstituted olefinic epoxides (1,1-disubstituted, 1,2-disubstituted, 1,1,2-trisubstituted and 1,1,2,2-tetrasubstituted olefinic epoxides) is from 0.05 to 5 milliequivalents of epoxide per gram of polymer (Meq/g), preferably from 0.1 to 3 Meq/g.

Useful randomly epoxidized star polymers are described in U.S. Pat. No. 5,247,026, issued Sep. 21, 1993, entitled "Randomly Epoxidized Small Star Polymers," which is herein incorporated by reference. That patent describes randomly epoxidized star polymers, based on at least one conjugated diolefin monomer, that contained di-, tri- and/or tetrasubstituted olefinic epoxides. The star polymers have greater than four arms or branches. Each arm has a molecular weight from 1500 to 15,000 and the concentration of di-, tri-, or tetrasubstituted olefinic epoxides (1,1-disubstituted, 1,2-disubstituted, 1,1,2-trisubstituted and 1,1,2,2-tetrasubstituted olefinic epoxides) is from 0.05 to 5 milliequivalents of epoxide per gram of polymer. In this invention, we prefer 0.1 to 3 Meq/g.

Other useful block copolymers are based on at least one conjugated diolefin monomer, contain a greater concentration of di-, or tri-, or tetrasubstituted olefinic epoxides in the exterior blocks, and lesser concentrations of these epoxides in the interior blocks of the polymer. The exterior blocks generally contain such epoxides within the concentration range of 0.2 to 10 milliequivalents of exterior block and the ratio of the concentration such epoxide groups in the exterior blocks to the concentration in the interior blocks is at least 3:1. The molecular weight of the exterior blocks ranges from 3000 to 50,000 and the molecular weight of the interior blocks ranges from 15,000 to 200,000. Such polymers are described in more detail in copending application Ser. No. 863,579, filed Apr. 3, 1992, entitled "Epoxidized Diene Elastomers for Exterior Block Crosslinking," which is herein incorporated by reference. A special case is where the exterior blocks are formed of polyisoprene polymerized under conditions that yield primarily 1,4-polyisoprene (trisubstituted) and the interior blocks are of polybutadiene (mono- or disubstituted). Another special case is where the exterior block is a random polystyrene-polyisoprene copolymer in which a majority of the polyisoprene is 1,4-polyisoprene and the interior block is polybutadiene. Such polymers give the advantage of localizing the crosslinking in the exterior blocks.

The present invention provides improved adhesives, sealants, and coatings which have a phase separated structure after curing to a crosslinked network. Phase separation is important to achieve a hard reinforcing phase dispersed in a continuous rubber phase which gives reinforcing properties to the composition. Phase separation is achieved by inclusion in the second reactive component of segments that are phase separated after curing with the reactive diene polymers. The co-reactive components include natural epoxy functional oils such as vernonia oil epoxidized linseed or soybean oil, and epoxidized linear, radial or star polymers having an epoxidized conjugated diene segment and a segment having a conjugated diene and a monoalkenyl aromatic hydrocarbon. In the epoxidized linear, radial or star coreactant, a monoalkenyl aromatic hydrocarbon content of 20% by weight or greater is preferred, and a monoalkenyl aromatic hydrocarbon content of 30% by weight or greater is most preferred.

The polymers containing conjugated dienes are prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like, but it also may be recovered as a liquid such as in the present invention.

Conjugated dienes which may be polymerized anionically include those conjugated dienes containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability.

Monoalkenyl aromatic compounds which may be copolymerized with the conjugated dienes in the co-reactive polymers include vinyl aryl compounds such as styrene, various alkyl-substituted styrenes, alkoxy-substituted styrenes, vinyl napthalene, alkyl-substituted vinyl napthalenes and the like.

The preferred epoxidized polymers have an epoxide equivalent weight of between about 10,000 and about 333. The polymers may then be crosslinked through at least some of the epoxy functionality.

The epoxidized copolymers of this invention can be prepared by the epoxidation procedures as generally described or reviewed in the *Encyclopedia of Chemical Technology* 19, 3rd ed., 251-266 (1980), D. N. Schulz, S. R. Turner, and M. A. Golub, *Rubber Chemistry and Technology*, 5, 809 (1982), W-K. Huang, G-H. Hsuie, and W-H. Hou, *Journal of Polymer Science, Part A: Polymer Chemistry*, 26, 1867 (1988), and K. A. Jorgensen, *Chemical Reviews*, 89, 431 (1989), and Hermann, Fischer, and Marz, Angew. *Chem. Int. Ed. Engl.* 30 (No. 12), 1638 (1991), all of which are incorporated by reference.

For instance, epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight carboxylic acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylenechloride and the like and epoxidation conducted in this new solution or can be epoxidized neat. Epoxidation temperatures on the order of 0° to 130° C. and reaction times from 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in diolefin polymer blocks containing both epoxide and hydroxy ester groups. Due to these side reactions caused by the presence of an acid, it is preferable to carry out the epoxidation at the lowest possible temperature and for the shortest time consistent with the desired degree of epoxidation. Epoxidation may also be accomplished by treatment of the polymer with hydroperoxides or oxygen in the presence of transition metals such as Mo, W, Cr, V and Ag, or with methyl-trioxorhenium/hydrogen peroxide with and without amines present. $^1$H NMR is an effective tool to determine which and how much of each type of olefinic double bond (ODB) is epoxidized. Further, the amount epoxy can also be measured by the direct titration with perchloric acid (0.1N) and quaternary ammonium halogenide (tetraethyl-ammonium bromide) where the sample is dissolved in methylene chloride. Epoxy titration is described in *Epoxy Resins Chemistry and Technology*, edited by Clayton A. May and published in 1988 (p. 1065) which is herein incorporated by reference.

The polymers of this invention are preferably cured (crosslinked) by ultraviolet or electron beam radiation, but radiation curing utilizing a wide variety of electromagnetic wavelengths is feasible. Either ionizing radiation such as alpha, beta, gamma, X-rays and high energy electrons or non-ionizing radiation such as ultraviolet, visible, infrared, microwave and radio frequency may be used.

The polymers may also be cured without the use of radiation by addition of a cationic initiator. Suitable initiators include the halides of tin, aluminum, zinc, boron, silicon, iron, titanium, magnesium and antimony, and the fluoroborates of many of these metals. $BF_3$ complexes such as $BF_3$ether and $BF_3$-amine are included. Also useful are strong Bronsted acids such as trifluoromethanesulfonic (triflic acid) and the salts of triflic acid such as FC-520 (3M Company). The cationic initiator is chosen to be compatible with the polymer being crosslinked, the method of application and cure temperature. The epoxy-containing polymers may also be crosslinked by the addition of multifunctional carboxylic acids, acid anhydrides, and alcohols, and in general by the curing methods described in U.S. Pat. No. 3,970,608, which is incorporated by reference. Volatile amines can be used to inhibit or retard unwanted cure, such as to maintain fluidity in one pack formulations until they are applied and reach the appropriate bake temperature for cure. They may also be cured by use of amino resins in the presence of a proton donating acid. Radiation crosslinking is preferred because reactive ingredients do not come in contact with warm adhesives.

The crosslinked materials of the present invention are useful in adhesives (including pressure sensitive adhesives, contact adhesives, laminating adhesives and assembly adhesives), sealants, coatings, films (such as those requiring heat and solvent resistance), printing plates, fibers, and as modifiers for polyesters, polyethers and polyamides. The polymers are also useful in asphalt modification. In addition to the functionalized polymer and any curing aids or agents, products formulated to meet performance requirements for particular applications may include various combinations of ingredients including adhesion promoting or tackifying resins, plasticizers, fillers, solvents, stabilizers, etc. as described in detail in the aforementioned commonly assigned applications which are incorporated by reference.

Compositions of the present invention are typically prepared by blending the components, preferably between 25° C. and 200° C., until a homogeneous blend is obtained, usually less than three (3) hours. Various methods of blending are known to the art and any method that produces a homogeneous blend is satisfactory. The resultant compositions may then preferably be used in a wide variety of applications. Alternatively, the ingredients may be blended into a solvent.

Adhesive compositions of the present invention may be utilized as many different kinds of adhesives, for example, laminating adhesives, flexible packaging laminated adhesives, pressure sensitive adhesives, tie layers, hot melt adhesives, solvent borne adhesives and waterborne adhesives in which the water has been removed before curing. The adhesive can consist of simply the epoxidized polymer or, more commonly, a formulated composition containing a significant portion of the epoxidized polymer along with other known adhesive composition components. A preferred method of application will be warm melt application at a temperature 20° to 130° C. because warm melt application is non-polluting and can be used on heat sensitive substrates. The adhesive can be heated before and after cure to further promote cure or post cure. Radiation cure of warm adhesive is believed to promote faster cure than radiation cure at room temperature.

Preferred uses of the present formulation are in the preparation of pressure-sensitive adhesive tapes, the manufacture of labels or flexible packaging, and strippable coatings. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes. Alternatively, when the amount of tackifying resin is zero, the compositions of the present invention may be used for adhesives that do not tear paper and molded goods and the like.

DETAILED DESCRIPTION OF PREFERRED EMBODIMENTS

The present invention is preferably a radiation curable composition, containing approximately equal amounts of an epoxidized radial polymer and a terpene tackifying resin, and from 5 to 15% by weight of an epoxidized polymer which results in phase separation. Higher amounts of the second reactive polymer increases the viscosity of the blend.

A most preferred reactive polymer is an epoxidized linear polymer having the structure epoxidized isoprene-styrene/hydrogenated butadiene-epoxidized isoprene. The epoxidized linear polymer is produced by hydrogenating and then epoxidizing a linear isoprene-styrene/butadiene-isoprene block copolymer wherein the styrene/butadiene block is random or tapered to improve phase separation with minimum impact on viscosity.

Preferred epoxidized radial polymers which are useful in the present invention consist of conjugated diene blocks that are coupled in a star arrangement. The star polymers are preferably lightly epoxidized near the end of the polymeric arms and are preferably hydrogenated to remove remaining unsaturation.

The polymers described immediately above are relatively high molecular weight, low viscosity materials. Blocks comprising predominantly conjugated diolefin monomer units generally will have peak molecular weights between about 1000 and about 17,000 prior to epoxidation.

For anionically polymerized linear polymers, the polymer is essentially monodisperse and it is both convenient and adequately descriptive to report the "peak" molecular weight of the narrow molecular weight distribution usually observed for the linear polymer or polymeric arm instead of true or average molecular weights. Measurement of the true molecular weight of the final coupled radial polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wave length and in the same solvent used for the light scattering.

The coreactive polymer blends of this invention are preferably cured by ultraviolet radiation, but radiation curing utilizing a wide variety of electromagnetic wavelength is feasible.

When using non-ionizing radiation it is necessary to employ a photoinitiator to initiate the crosslinking reaction. Useful photoinitiators include diaryliodonium, alkoxy-substituted diaryliodonium, triarylsulfonium, dialkylphenacylsulfonium, and dialkyl-4-hydrophenysulfonium salts. The anions in these salts generally possess low nucleophilic character and include $SbF_6-$, $BF_4-$, $PF_6-$ and $AsF_6-$. Specific examples include (4-octyloxyphenyl)-phenyl-iodium hexafluoroantimonate, UVI-6990 (from Union Carbide), and FX-512 (3M Company). UVI-6974, an aryl sulfonium salt from Union Carbide, and bis(dodecylphenyl)iodonium hexaflouroantimonate, UV9310C (from General Electric) are especially effective. The salts can be used alone or in conjunction with a photosensitizer to respond to long wave length UV and visible light. Examples of photosensitizers include thioxanthone, anthracene, perylene, phenothiazione, 1,2-benzathracene coronene, pyrene and tetracene. The photoinitiator and photosensitizer are chosen to be compatible with the polymer being crosslinked and the light source available.

Radiation induced cationic curing may also be done in combination with free radical curing. Free radical curing can be further enhanced by the addition of additional free radical photoinitiators and photosensitizers for them.

In the radiation crosslinked compositions of the present invention, including adhesives, coatings and sealants, it is usual to add an adhesion promoting or tackifying resin that is compatible with the polymer. The prior art, as exemplified by U.S. Pat. No. 4,135,031, teaches that hydrogenated rosins, esters of rosins and other rosin materials are very compatible with epoxidized diene polymers. This indeed appears to be true. However, the prior art evidently did not attempt to radiation crosslink the compositions described including epoxidized diene polymers and rosin tackifying resins. The rosin materials interfere with the cure of the composition and thus were not desirable for use in the radiation crosslinked compositions of the present invention.

Preferred tackifying resins include a diene-olefin copolymer of piperylene and 2-methyl-2-butene having a softening point of about 95° C., commercially available as Wingtack ® 95, hydrogenated polystyrene or polyalphamethylstyrene resins such as Regalrez ® 1094 resin from Hercules, and terpene resins.

The Applicants herein have found that terpene tackifying resins are very compatible with the epoxidized polymers used in the present invention. Terpene tackifying resins include terpene itself ($C_{10}H_{16}$) which is an unsaturated hydrocarbon occurring in most essential oils and oleo resins of plants. The terpenes are based on the isoprene unit $H_2C=C(CH_3)-C(H)=CH_2$ and may be either acyclic or cyclic with one or more benzenoid groups. They are classified as monocyclic (dipentene), dicyclic (pinene), or acyclic (myrcene). Also included are styrenated terpenes and polyterpene resins. Specific examples of commercially available polyterpenes which can be used herein are Piccolyte ® A115, A125 and A135 resins made by Hercules which are produced from the terpene monomer α-pinene and the Zonatac ® resins made by Arizona. The terpene resins will generally be used in the range of 20 to 400 parts of terpene resin per 100 parts of polymer (by weight), preferably 30 parts to 200 parts.

Epoxidized terpenes may also be used in the present invention as the tackifying resin. Terpenes may be epoxidized in the same manner as the polymer is epoxidized. The epoxidized terpenes work as well as unepoxidized terpenes and in some cases it appears that there are advantages to using epoxidized terpenes.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo ® 6056 and 6204 oil made by Arco and process oils, e.g. Shellflex ® 371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Various types of fillers and pigments can be included in the coating or sealant formulation. This is especially true for exterior coatings or sealants in which fillers are added not only to create the desired appeal but also to improve the performance of the coatings or sealant such as its weatherability. A wide variety of fillers can be used. Suitable fillers include calcium carbonate, clays, talcs, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide.

If the coating or sealant will be applied from solvent solution, the organic portion of the formulation will be dissolved in a solvent or blend of solvents. Aromatic hydrocarbon solvents such as toluene, xylene, or Shell Cyclo Sol 53 are suitable. Aliphatic hydrocarbon solvents such as hexane, naphtha or mineral spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50% w in the solvent blend.

Additional stabilizers known in the art may also be incorporated into the adhesive composition. These may be for protection during the life of the article against, for example, oxygen, ozone and ultra-violet radiation. However, these additional stabilizers should be compatible with the essential stabilizers mentioned hereinabove and their intended function as taught herein.

The adhesive, coating and sealant compositions of the present invention are typically prepared by blending the components at an elevated temperature, preferably between about 50° C. and about 200° C., until a homogeneous blend is obtained, usually less than three (3) hours. Various methods of blending are known to the art and any method that produces a homogeneous blend is satisfactory. The resultant compositions may then preferably be used in a wide variety of applications. Alternatively, the ingredients may be blended into a solvent.

The adhesive compositions of the present invention may be utilized as many different kinds of adhesives, for example, laminating adhesives, pressure sensitive adhesives, tie layers, hot melt adhesives, solvent borne adhesives and waterborne adhesives in which the water has been removed before curing. The adhesive can consist of simply the epoxidized polymer or, more commonly, a formulated composition containing a significant portion of the epoxidized polymer along with other known adhesive composition components. A preferred method of application will be hot melt application at a temperature around or above 100° C. because hot melt application above 100° C. minimizes the presence of water and other low molecular weight inhibitors of cationic polymerization. The adhesive can be heated before and after cure to further promote cure or post cure. Radiation cure of hot adhesive is believed to promote faster cure than radiation cure at lower temperatures.

Preferred uses of the present formulation are the preparation of pressure-sensitive adhesive tapes and the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes. Alternatively, when the amount of tackifying resin is zero, the compositions of the present invention may be used for adhesives that do not tear paper and molded goods and the like.

Coating compositions are useful for strippable coatings for protecting metal products prior to use, high friction coatings, waterproofing coatings, shatter retentive coatings, coating for optical fibers, etc. Sealant compositions are useful for insulated glass windows, construction sealants, corrosion protective sealants (i.e. weldable sealants for the automotive industry, etc.), etc.

EXAMPLE 1 (Comparison)

This example demonstrates, for comparison to the present invention, a crosslinked pressure sensitive adhesive layer containing an epoxidized star polymer as described in U.S. Pat. No. 5,229,464. The epoxidized polymer used in this example is an epoxidized isoprene-butadiene star polymer (205) having an arm molecular weight of 5600, approximately 13 arms and an epoxy content of 0.65 Meq per gram of polymer. Coreactants such as other epoxidized polymers or epoxidized diluents or reactive diluents are absent from the formulation of this example.

An adhesive composition containing 49.6 wt % of the epoxidized star polymer, 49.6 wt % of Zonatac® 105L thermoplastic modified terpene hydrocarbon resin from Arizona Chemical Company, 0.5 wt % of UVI 6974 photoinitiator, and 0.3 wt % of Irganox 1010 antioxidant was cast from tetrahydrofuran (THF) onto a 1 mil polyester backing film. The coated film was prebaked for 2 minutes at 121° C. to simulate a warm application and UV cured at 30 feet per minute under a single medium pressure mercury lamp. The adhesive layer changed from a sticky, viscous state to a tacky state having good internal strength. The adhesive was postbaked for 10 minutes at 121° C. to assure full cure to ultimate properties.

The adhesive layer had the following properties which are typically measured for pressure sensitive adhesives.

| Film Appearance | Clear |
| --- | --- |
| Feel | Tacky |
| Polymer Gel Content | 74% |
| Polyken Probe Tack[1] | 0.67 Kg |
| TLMI Loop Tack | 1.6 pli |
| 180° Peel from Steel | 3.9 pli |
| Holding Power to Steel[2] at 23° C. | 54 hrs. |

[1]Adhesion lost between the adhesive layer and the polyester backing.
[2]Tested with 1 in. × 1 in. overlap and a 2 Kg weight.

Importantly, this cured formulation appeared clear. Blends or formulations which are not phase separated are clear. Since this formulation is clear, phase separation is not suggested. Therefore, the balance of properties achieved with the cured formulation of this example is representative of adhesives not having phase separation. The following adhesive layers were prepared by the same process except that a coreactant is incorporated at an amount of 10% of the total weight of the adhesive composition.

EXAMPLE 2

This example demonstrates a crosslinked pressure sensitive adhesive prepared from epoxidized star polymers and a coreactant as described in the present application. The adhesive composition contains 44.6 wt % of the epoxidized star polymer of Example 1, 44.6 wt % of the Zonatac® 105L resin, 10 wt % of vernonia oil which is a natural epoxy functional oil having about 3 epoxies per molecule, 0.5 wt % of UVI 6974 photoinitiator, and 0.3 wt % Irganox 1010 antioxidant was cast from tetrahydrofuran (THF) onto a 1 mil polyester backing film. The coated film was prebaked for 2 minutes at 121° C. to simulate a warm application and UV cure at 30 feet per minute under a single medium pressure mercury lamp. The adhesive layer changed from a sticky, viscous state to a tacky state having good internal strength. The adhesive was postbaked for 10 minutes at 121° C. to assure full cure to ultimate properties.

The adhesive layer had the following properties which are typically measured for pressure sensitive adhesives.

| Film Appearance | Slightly Hazy |
| --- | --- |
| Feel | Tacky |
| Polymer Gel Content | 75% |
| Polyken Probe Tack | 0.69 Kg |
| TLMI Loop Tack | 3.4 pli |
| 180° Peel from Steel | 2.1 pli |
| Holding Power to Steel[1] at 23° C. | >67 hrs. |
| Shear Adhesion Failure Temp.[2] | >143° C. |

[1]Tested with 1 in. × 1 in. overlap and 2 Kg weight.
[2]Tested with 1 in. × 1 in. overlap and 500 g weight.

This coreactive pressure sensitive adhesive composition had an excellent balance of properties attributed to phase separation during crosslinking. The cured composition is judged phase separated because of the slightly hazy appearance. Incorporation of the coreactive vernonia oil yielded a pressure sensitive adhesive with excellent adhesion above 143° C. at high shear and enhanced tack properties.

EXAMPLE 3

This example demonstrates a crosslinked pressure sensitive adhesive prepared from epoxidized star polymers and a coreactant as described in the present application. The adhesive composition contains 44.6 wt % of the epoxidized star polymer of Example 1, 44.6 wt % of the Zonatac® 105L resin, 10 wt % of an epoxidized linear polymer (204) having the structure epoxidized isoprene-hydrogenated styrene/butadiene-epoxidized isoprene with a peak molecular weight of 6,000 available from Shell Chemical Company, 0.5 wt % of UVI 6974 photoinitiator, and 0.3 wt % of Irganox 1010 antioxidant was cast from tetrahydrofuran (THF) onto a 1 mil polyester backing film. The coated film was prebaked for 2 minutes at 121° C. to simulate a warm application and UV cure at 30 feet per minute under a single medium pressure mercury lamp. The adhesive layer changed from a sticky, viscous state to a tacky state having good internal strength. The adhesive was postbaked for 10 minutes at 121° C. to assure full cure to ultimate properties.

The adhesive layer had the following properties which are typically measured for pressure sensitive adhesives.

| Film Appearance | Cloudy |
|---|---|
| Feel | Tacky |
| Polymer Gel Content | 70% |
| Polyken Probe Tack | 0.46 Kg |
| TLMI Loop Tack | 3.4 pli |
| 180° Peel from Steel | 2.0 pli |
| Holding Power to Steel[1] at 23° C. | >67 hrs. |
| Shear Adhesion Failure Temp.[2] | >143° C. |

[1]Tested with 1 in. × 1 in. overlap and 2 Kg weight.
[2]Tested with 1 in. × 1 in. overlap and 500 g weight.

This coreactive pressure sensitive adhesive composition had an excellent balance of properties attributed to phase separation during crosslinking. The cured composition is judged phase separated because of the cloudy appearance. In comparison to Example I which had excellent tack and adhesion failure at room temperature under low shear, the composition of Example 3, which had incorporated a coreacting linear epoxidized polymer, had moderate tack and retained adhesion above 143° C. at high shear. Incorporation of the coreacting polymer (204) yielded a pressure sensitive adhesive with excellent adhesion above 143° C. at high shear and enhanced tack property.

EXAMPLE 4

This example demonstrates a strippable coating prepared from epoxidized star polymers and a coreactant as described in the present application. The adhesive composition contains 44.6 wt % of the epoxidized star polymer of Example 1, 44.6 wt % of the Zonatac® 105 L resin, 10 wt % of Drapex® 6.8 epoxidized soybean oil from Witco Chemical, 0.5 wt % of UVI 6974 photoinitiator, and 0.3 wt % of Irganox 1010 antioxidant was cast from tetrahydrofuran (THF) onto a 1 mil polyester backing film. The coated film was prebaked for 2 minutes at 121° C. to simulate a warm application and UV cure at 30 feet per minute under a single medium pressure mercury lamp. The coating layer changed from a sticky, viscous state to a tacky state having good internal strength. The coating was postbaked for 10 minutes at 121° C. to assure full cure to ultimate properties.

The coating layer had the following properties which are typically measured for strippable coatings.

| Film Appearance | Slightly Hazy |
|---|---|
| Feel | Tacky to Cohesive |
| Polymer Gel Content | 69% |
| Polyken Probe Tack | 0.03 Kg |
| TLMI Loop Tack | 0.5 pli |
| 180° Peel from Steel | 3.8 pli |
| Holding Power to Steel[1] at 23° C. | >46 hrs. |
| Shear Adhesion Failure Temp.[2] | >96° C. |

[1]Tested with 1 in. × 1 in. overlap and 2 Kg weight.
[2]Tested with 1 in. × 1 in. overlap and 500 g weight.

This coreactive strippable coating composition had excellent strength and poor tack attributed to phase separation during crosslinking. The cured composition is judged phase separated because of the slightly hazy appearance. A similar composition prepared with Drapex® 10.4 epoxidized linseed oil had lower peel strength at 2.0 pli.

EXAMPLE 5 (Comparison)

This example demonstrates the need to sometimes use two or more photoinitiators to ensure solubility in all phases of the formulation so that all phases are crosslinked when making adhesives or coatings from epoxidized star polymers. The adhesive composition contains 44.6 wt % of the epoxidized star polymer of Example 1, 44.6 wt % of the Zonatac® 105 L resin, 10 wt % of URV 6110 cycloaliphatic diepoxide from Union Carbide, 0.5 wt % of UVI 6974 photoinitiator, and 0.3 wt % of Irganox 1010 antioxidant was cast from tetrahydrofuran (THF) onto a 1 mil polyester backing film. The coated film was prebaked for 2 minutes at 121° C. to simulate a warm application and UV cure at 30 feet per minute under a single medium pressure mercury lamp. The adhesive layer had no measurable gel content after curing which is attributed to selective absorbance of the photoinitiator into the cycloaliphatic diepoxide which cured as fine particles that passed through the 100 mesh screen used to collect the gel. In other words, the minor phase was selectively cured leaving an uncured major phase which was easily dissolved in solvent. The same result was obtained by replacing the URV 6110 cycloaliphatic diepoxide with ERL 4234 cycloaliphatic diepoxide from Union Carbide.

We claim:

1. A phase separated cured polymeric composition, comprising:
   from 20 to 70% by weight of a first epoxidized polymer of at least one saturated or unsaturated conjugated diene;
   from 1 to 30% by weight of a second epoxidized polymer having segments that phase separate from the first epoxidized polymer, wherein the second epoxidized polymer is an epoxidized linear polymer having the structure epoxidized isoprene-styrene/hydrogenated butadiene-epoxidized isoprene; and
   from 0% to 80% by weight of a tackifying resin.

2. The composition of claim 1, wherein the first epoxidized polymer has at least four arms of polymerized isoprene and butadiene connected to a divinylbenzene core.

3. The composition of claim 2 wherein the second epoxidized polymer has a peak molecular weight of about 6,000.

4. The composition of claim 3, wherein the first epoxidized polymer has at least 10 arms and each arm has a peak molecular weight from 3,000 to 18,000.

5. The composition of claim 4, wherein the second epoxidized polymer is present at 10% by weight of the composition and the amount of epoxidized polymer equals the amount of tackifying resin.

6. A cured phase separated composition, produced by the process of:

blending from 20% to 70% by weight of a first epoxidized polymer of at least one saturated or unsaturated conjugated diene, from 1% to 30% by weight of a second epoxidized polymer which is an epoxidized linear polymer having the structure epoxidized isoprene-styrene/hydrogenated butadiene-epoxidized isoprene, and from 0% to 80% by weight of a tackifying resin; and curing the blend of epoxidized polymers to obtain a phase separated composition.

7. The composition of claim 6 wherein the second epoxidized polymer has a peak molecular weight of about 6,000.

8. The composition of claim 7 wherein the first epoxidized polymer has at least 4 arms connected to a divinylbenzene core, and each arm has a peak molecular weight from 3,000 to 18,000.

9. An adhesive composition comprising the phase separated cured composition of claim 1.

10. A coating composition comprising the phase separated cured composition of claim 1.

11. A sealant composition comprising the phase separated cured composition of claim 1.

12. An adhesive composition comprising the phase separated cured composition of claim 6.

13. A coating composition comprising the phase separated cured composition of claim 6.

14. A sealant composition comprising the phase separated cured composition of claim 6.

* * * * *